(12) United States Patent
Ito (10) Patent No.: US 9,041,949 B2
(45) Date of Patent: May 26, 2015

(54) IMAGE FORMING APPARATUS, CONTROL METHOD OF IMAGE FORMING APPARATUS, AND COMPUTER-READABLE STORAGE MEDIUM

(71) Applicant: CANON KABUSHIKI KAISHA, Tokyo (JP)

(72) Inventor: Koichi Ito, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/759,830

(22) Filed: Feb. 5, 2013

(65) Prior Publication Data

US 2013/0201516 A1  Aug. 8, 2013

(30) Foreign Application Priority Data

Feb. 8, 2012  (JP) ................. 2012-025333

(51) Int. Cl.
 G06K 15/00 (2006.01)
 H04N 1/00 (2006.01)

(52) U.S. Cl.
 CPC ....... *H04N 1/00891* (2013.01); *H04N 1/00204* (2013.01); *H04N 2201/0075* (2013.01); *H04N 2201/0094* (2013.01)

(58) Field of Classification Search
 None
 See application file for complete search history.

(56) References Cited

U.S. PATENT DOCUMENTS

| 6,509,975 B1 | 1/2003 | Motegi |
| 2010/0073713 A1* | 3/2010 | Chae ............................ 358/1.15 |
| 2010/0312600 A1* | 12/2010 | Motoyama ........................ 705/8 |
| 2011/0249291 A1* | 10/2011 | Tsuzuki et al. .............. 358/1.15 |

FOREIGN PATENT DOCUMENTS

| CN | 1842124 A | 10/2006 |
| CN | 101060580 A | 10/2007 |
| CN | 101930274 A | 12/2010 |
| CN | 102033601 A | 4/2011 |
| CN | 102065195 A | 5/2011 |
| CN | 102314324 A | 1/2012 |
| JP | 2000-020179 A | 1/2000 |

* cited by examiner

*Primary Examiner* — Fred Guillermety
*Assistant Examiner* — Keara Harris
(74) *Attorney, Agent, or Firm* — Canon U.S.A., Inc. IP Division (57) ABSTRACT

An image forming apparatus configured to enter in a first power state and a second power state, a reception unit configured to receive a power down command, an operation unit configured to receive an operation of a user, and a control unit configured, if the reception unit receives the power down command, in a case where an elapse time without operating the operation unit is less than a preset time, to execute shift processing for shifting the power state of the image forming apparatus from the second power state to the first power state after elapse of a predetermined time after receiving the data, and in a case where the elapse time without operating the operation unit is equal to or more than the preset time, to execute the shift processing before the elapse of the predetermined time after receiving the power down command.

9 Claims, 12 Drawing Sheets

IMAGE FORMING APPARATUS, CONTROL METHOD OF IMAGE FORMING APPARATUS, AND COMPUTER-READABLE STORAGE MEDIUM

BACKGROUND OF THE INVENTION

1. Field of the Invention

The present invention relates to an image forming apparatus that can receive data sent from an external device, and a control method of the image forming apparatus.

2. Description of the Related Art

Conventionally, Japanese Patent Application Laid-Open No. 2000-20179 discusses a printer system that turns on/off power of a printer from a server or a computer in a remote place. In the printer system as discussed in Japanese Patent Application Laid-Open No. 2000-20179, a plurality of computers is communicably connected via the server to the printer. If the computer outputs a power supply off request to turn off the power supply of the printer to the server, the server checks an operation situation of another computer. If the other computer is not operated, the power supply off request is output to the printer to turn off the power supply of the printer.

It is assumed that a user sets execution of copy by using an operation unit of the printer or sets an address book. If the power supply off request discussed in Japanese Patent Application Laid-Open No. 2000-20179 is output from the computer to the printer, the power supply of the printer is turned off in spite of the operation during the setting. Although the user operates the printer, the power supply of the printer is forcibly turned off and the setting operation of the user is interrupted. Therefore, the convenience of the user deteriorates because the printer requires start to restart the setting operation by the user.

SUMMARY OF THE INVENTION

The present invention is directed to preventing the deterioration in convenience of a user even if a request to shift a power state of an image forming apparatus from an external device while the user operates an operation unit.

According to an aspect of the present invention, an image forming apparatus configured to enter in a first power state in which electric power is not supplied to a part of the image forming apparatus and in a second power state in which electric power is supplied to the part of the image processing apparatus includes a reception unit configured to receive a power down command which causes the image forming apparatus to enter in the first power state sent from an external device, an operation unit configured to receive an operation of a user, and a control unit configured, if the reception unit receives the power down command, in a case where an elapse time without operating the operation unit is less than a preset time, to execute shift processing for shifting the power state of the image forming apparatus from the second power state to the first power state after elapse of a predetermined time after receiving the power down command, and in a case where the elapse time without operating the operation unit is equal to or more than the preset time, to execute the shift processing for shifting the power state of the image forming apparatus from the second power state to the first power state before the elapse of the predetermined time after receiving the power down command.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A first exemplary embodiment of the present invention will be described. According to the first exemplary embodiment, referring to FIG. 1, an image forming apparatus 1 includes an image reader 200 and a printer unit 300. A document conveyance device 100 is attached to the top of the image reader 200. The image forming apparatus 1 is in a normal power state (first power state), a sleep state (second power state), or a power supply off state (specific power state).

Figure 1:
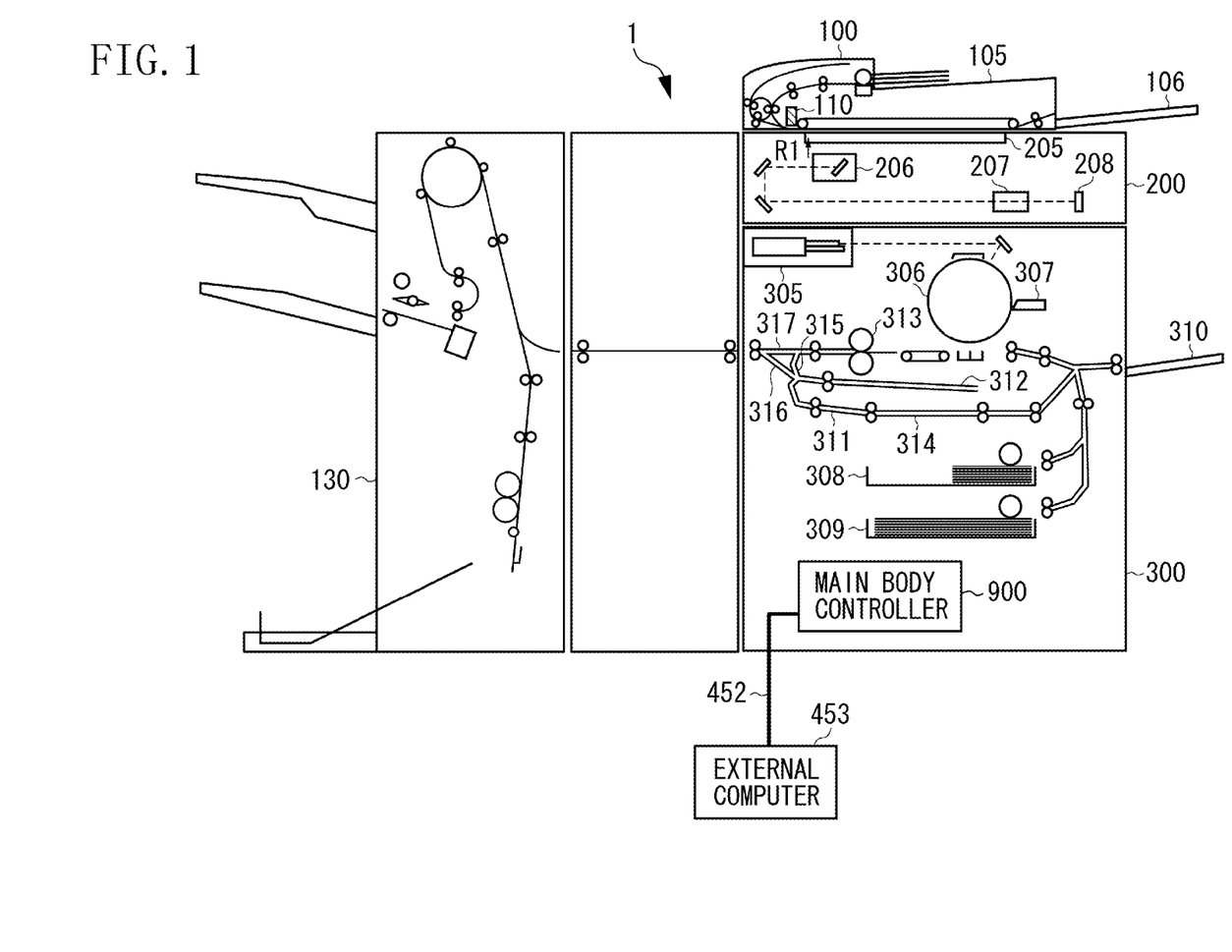
FIG. 1 illustrates a configuration of an image forming apparatus according to a first exemplary embodiment.

The document conveyance device 100 sequentially feeds documents set on a document tray 105 from a top page one by one. The fed document is conveyed via a bent path to a platen glass 205. A method for reading a one-sided document includes a document fixed reading mode and a document skimming-through reading mode. In the document fixed reading mode, the document is conveyed so that a trailing edge of the document stops at a reading position R1 on the platen glass 205. A scanner unit 206 is moved from the reading position R1 to the reading position R1 in a far direction (from the left to the right on the sheet surface), thereby reading the document at a stop. In the document skimming-through reading mode, the document is conveyed at a predetermined reading speed until the trailing edge of the document reaches the reading position R1 on the platen glass 205. In this case, the scanner unit 206 reads the document while being fixed at the reading position R1. The document read in the above mode is discharged to a sheet discharge tray 106.

A method for reading a two-sided document includes a method for reading a front surface of the document by the scanner unit 206 and reading a rear surface of the document by an optical unit 110 arranged in the document conveyance device 100. The details are described later. An image sensor and a light source (not illustrated) are arranged in the optical unit 110.

An image of the document read by an image sensor 208 via a lens 207 is subjected to image processing to be stored to a hard disk (not illustrated), and is sent to an exposure control unit 305. The exposure control unit 305 outputs laser beams corresponding to an image signal of the document image. The laser beams are emitted to a photosensitive drum 306. Then, an electrostatic image is formed onto the photosensitive drum 306. A developing unit 307 develops the electrostatic image on the photosensitive drum 306. A developer on the photosensitive drum 306 is transferred by a transfer unit 312 to a sheet supplied from any of a cassette 308, a cassette 309, a manual feed unit 310, and a two-sided conveyance path 311.

The sheet to which the developer is transferred is supplied to a fixing unit 313, and the fixing unit 313 performs fixing processing on the developer. A sheet passing through the fixing unit 313 is temporarily guided to a path 314 from a path 315 by a flapper (not illustrated). After the trailing edge of the sheet passes through the path 315, the sheet is switched back. The sheet is guided from a path 316 to a discharge roller 317. As a consequence, the discharge roller 317 discharges from the printer unit 300 the sheet having the surface to which the developer is transferred faced down. The sheet is thus discharged, faced down, so that the image is formed in correct order from the top page when a plurality of documents set to the document conveyance device 100 is copied.

When an image is formed to a hard sheet such as an overhead projector (OHP) sheet from the manual feed unit 310, the sheet having the surface to which the developer is transferred, faced up, is discharged from the discharge roller 317 without being guided to the path 315.

If the image is formed onto both surfaces of the sheet, the sheet having the image on the front surface is guided from the fixing unit 313 to the path 314 via the path 315. After the trailing edge of the sheet passes through the path 315, the sheet is switched back. The sheet is guided to the two-sided conveyance path 311 by the flapper (not illustrated). The transfer unit 312 transfers the developer to the rear surface of the sheet guided to the two-sided conveyance path 311. The fixing unit 313 performs fixing processing on the developer.

A path length, a roller arrangement, and a drive system are divided so that the sheets can be conveyed if five sheets of half-sized sheet such as A4 or B5 are loaded in a path circulating from/to the transfer unit 312 via the two-sided conveyance path 311. In the discharge page order with the above processing, the sheet is discharged so that an odd-number page is faced down. Thus, the page order in two-sided copy is correct.

Figure 2:
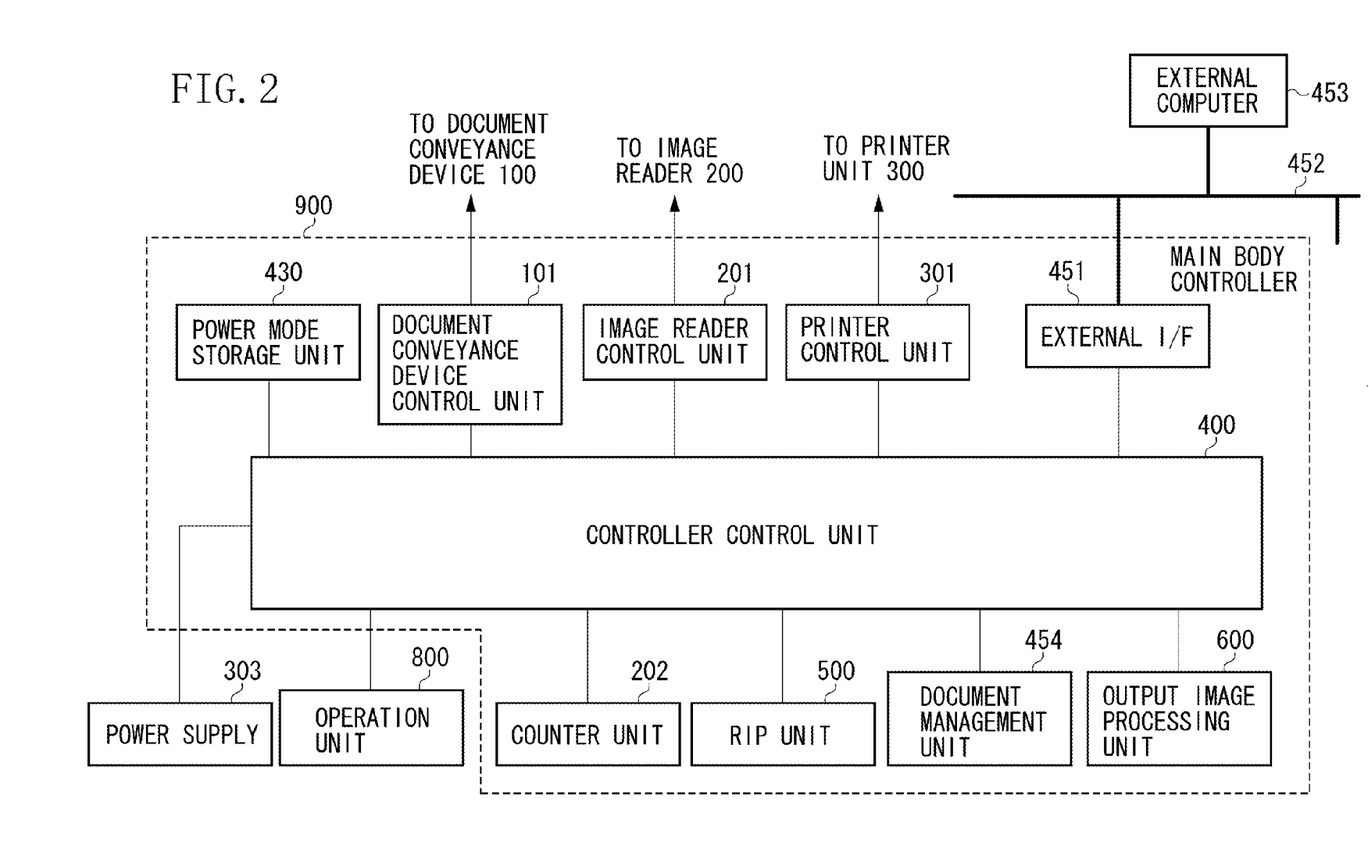
FIG. 2 illustrates a block diagram of a main body controller of the image forming apparatus in FIG. 1.

A main body controller 900 for controlling the entire image forming apparatus 1 is specifically described with reference to FIG. 2.

The main body controller 900 is connected to an external computer 453 via an external bus 452. Referring to FIG. 2, the main body controller 900 includes a controller control unit 400, a document conveyance device control unit 101, an image reader control unit 201, a printer control unit 301, an external interface (I/F) 451, a counter unit 202, a raster image processing (RIP) unit 500, a document management unit 454, and an output image processing unit 600.

The controller control unit 400 controls units in the image forming apparatus 1 based on a setting of an operation unit 800 and an instruction from the external computer 453. The controller control unit 400 communicates with the document conveyance device control unit 101 that controls the document conveyance device 100 and the image reader control unit 201 that controls the image reader 200, thereby obtaining image data of the read document. The controller control unit 400 communicates with the printer control unit 301 that controls the printer unit 300 to print the image data to the sheet.

If a page description language (PDL) job is input from the external computer 453, the raster image processor (RIP) unit 500 performs RIP processing. A document management unit 454 holds the image data rasterized by the RIP unit 500. Further, the output image processing unit 600 performs image processing with respect to the image printed by the printer unit 300 according to the necessity.

The counter unit 202 counts a time (hereinafter, referred to as a continuous time without operations) without operations of the operation unit 800 by the user. Specifically, the counter unit 202 receives from a main control unit 304 a signal indicating that the operation of the operation unit 800 is detected, and starts to count the time. According to the present exemplary embodiment, if issuing a request (data for shifting the power state of the image forming apparatus 1 to a power supply off state) (hereinafter, referred to as a power supply off request) for turning off the power supply of the image forming apparatus 1 from the external computer 453 with a remote operation, the power supply on/off operation of the image forming apparatus 1 is controlled based on the continuous time without operations counted by the counter unit 202. The details are described later.

The external I/F 451 communicably connects the external computer 453 to the image forming apparatus 1 to be. The external I/F 451 receives data from the external computer 453 connected via an external bus 452 such as a network or a universal serial bus (USB).

Figure 3:
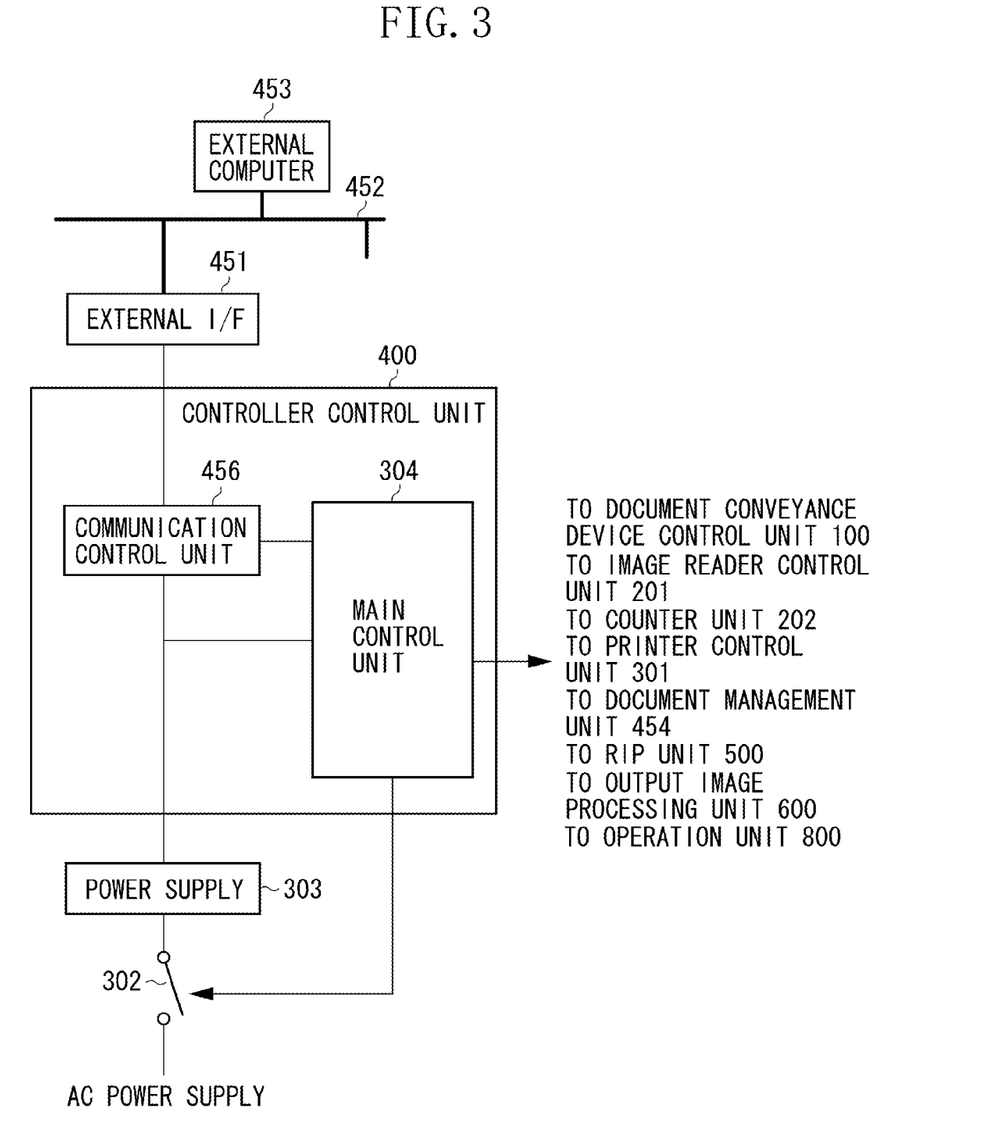
FIG. 3 illustrates a block diagram of a controller control unit in FIG. 2.

The details of the controller control unit 400 are described with reference to FIG. 3.

The controller control unit 400 includes a communication control unit 456 and the main control unit 304. The main control unit 304 controls units in the image forming apparatus 1 based on an operating system (hereinafter, referred to as an OS). The communication control unit 456 controls the external I/F 451. The main control unit 304 executes a power supply off sequence when the image forming apparatus 1 enters the power supply off state.

The main control unit 304 drives a solenoid (not illustrated) to turn off a power switch 302, thereby setting the image forming apparatus 1 to the power supply off state. When the image forming apparatus 1 is started, the user sets the power switch 302 to an on-state. The main control unit 304 is connected to the document conveyance device control unit 101, the image reader control unit 201, the printer control unit 301, the document management unit 454, the RIP unit 500, the output image processing unit 600, and the operation unit 800, and controls the units.

According to the present exemplary embodiment, if the external I/F 451 receives the power supply off request from the external computer 453, the reception of the power supply off request is transmitted from the communication control unit 456 to the main control unit 304. The main control unit 304 determines whether the operation unit 800 of the image forming apparatus 1 is operated within a predetermined time before receiving the power supply off request. Specifically, the main control unit 304 obtains the continuous time without operations from the counter unit 202, and determines whether the continuous time without operations is less than a first-time preset by the user. If the operation unit 800 is not operated within a predetermined time before receiving the power supply off request, the main control unit 304 executes the power supply off sequence to execute shift processing for turning off the power supply of the image forming apparatus 1, thereby turning off the power switch 302. As a consequence, the power supplied from a power supply 303 to the main control unit 304 stops. Details of the determination of the main control unit 304 are described later.

Figure 4:
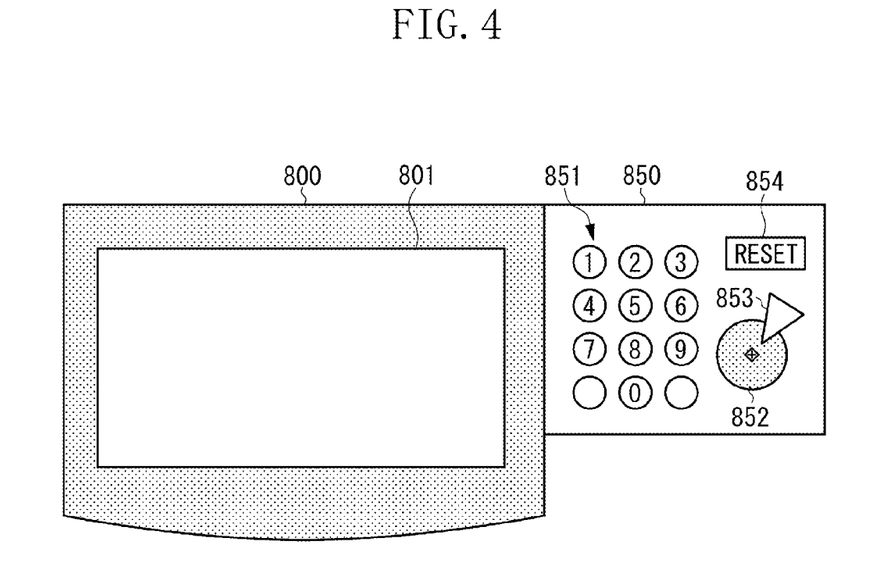
FIG. 4 illustrates details of an operation unit in FIG. 2.

Details of a configuration of the operation unit 800 of the image forming apparatus 1 are described with reference to FIG. 4. The operation unit 800 includes a LCD display unit 801 and a key operation unit 850 having various keys. A touch panel sheet adheres to the surface of the LCD display unit 801. The LCD display unit 801 displays an operation screen of the image forming apparatus 1. If a key displayed on the operation screen is pressed via a touch panel, the pressed positional information is transmitted to the controller control unit 400.

A key operation unit 850 includes a numeric keypad 851, a start key 852, a stop key 853, and a reset key 854. The numeric keypad 851 is used when inputting numerals such as the number of copies. After the user sets a desired condition with the operation unit 800, the start key 852 is used to start a print operation or a reading operation. The stop key 853 is used to stop the print operation or the reading operation in progress. The reset key 854 is used to reset contents for setting the desired condition by the user with the operation unit 800.

Figure 7:
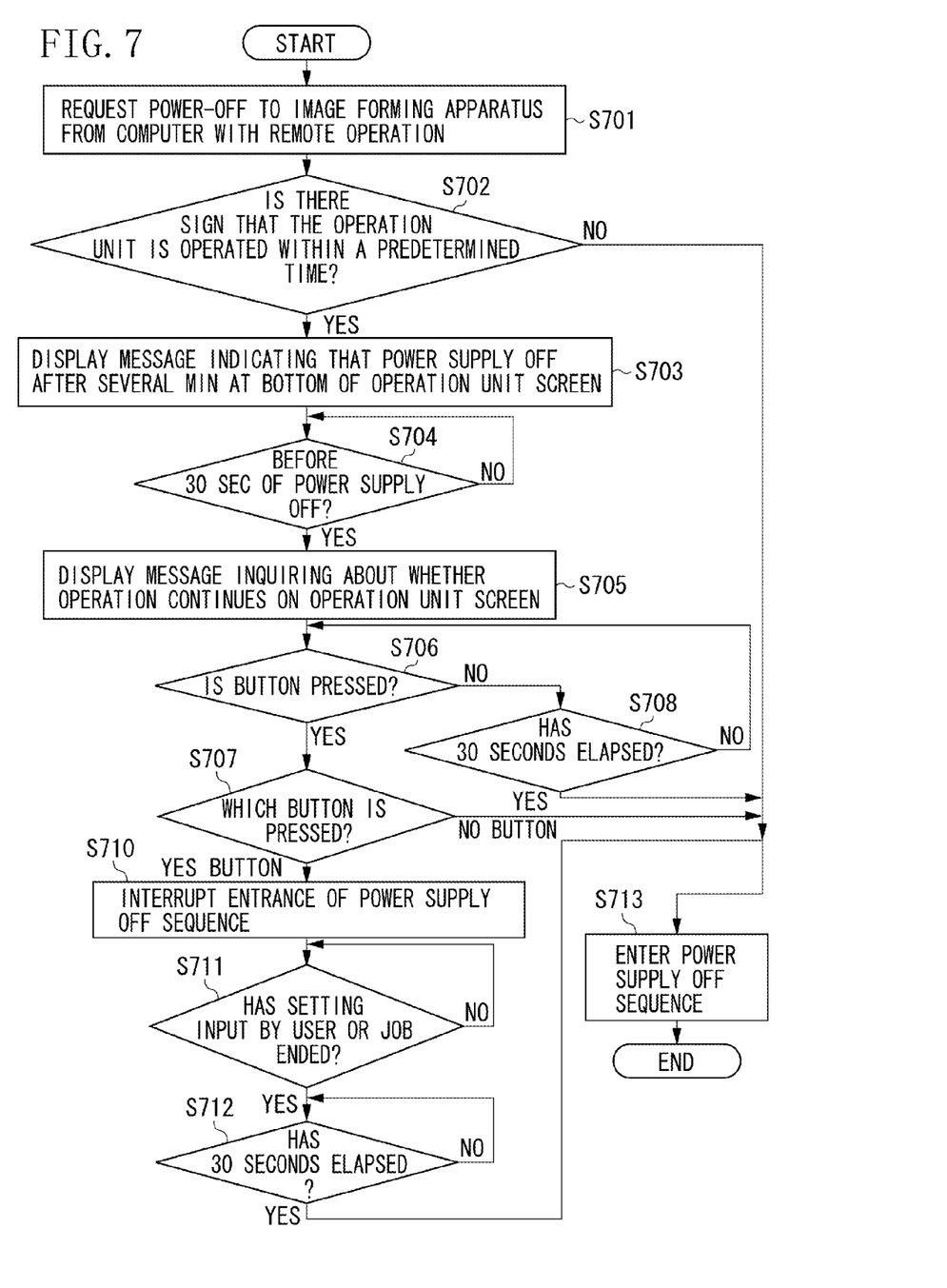
FIG. 7 illustrates a flowchart of an operation when the image forming apparatus according to the first exemplary embodiment receives a power supply off request from an external device.

A flow to the power supply off of the image forming apparatus 1 with a remote operation is described with reference to FIG. 7.

Figure 5A:
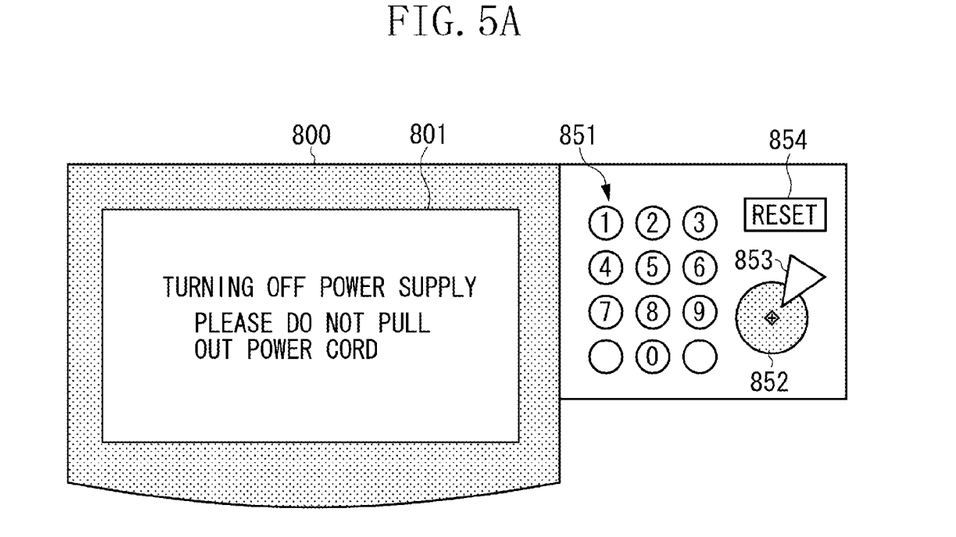
FIGS. 5A and 5B illustrate a display screen of the operation unit in FIG. 4.

In step S701, the external I/F 451 receives the power supply off request transmitted from the image forming apparatus 1 via the network from the external computer 453. In step S702, the main control unit 304 determines whether there is sign that the operation unit 800 is operated within a predetermined time before receiving the power supply off request. Specifically, in step S702, the main control unit 304 obtains a non-operation time counted by the counter unit 202 and determines whether the obtained time is the predetermined time or more. The non-operation time counted by the counter unit 202 is the above described continuous time without operations. If the main control unit 304 determines that the non-operation time obtained from the counter unit 202 is equal to or more than the predetermined time (the first time) (NO in step S702), in step S713, the main control unit 304 executes the power supply off sequence for shutting down the image forming apparatus 1. As illustrated in FIG. 5A, the LCD display unit 801 displays a screen (for displaying 'Turning off power supply. Please do not pull out a power cord.' in FIG. 5A) for indicating turning off the power supply of the image forming apparatus 1. The main control unit 304 executes the power supply off sequence, thereby turning off the power switch 302. The power supplied from the power supply 303 to the units such as the main control unit 304 stops. As a consequence, the image forming apparatus 1 enters the power supply off state.

Figure 5B:
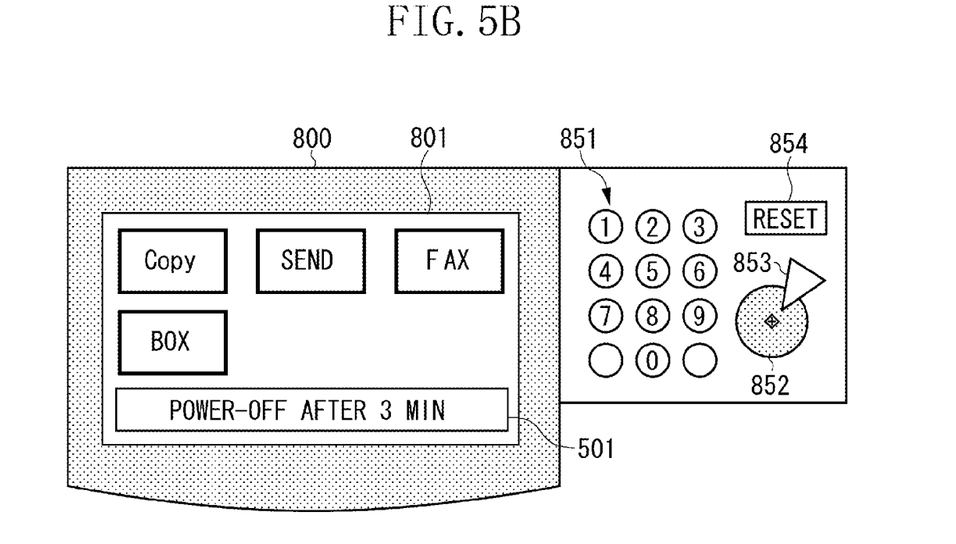

If the main control unit 304 determines that the continuous time without operations obtained from the counter unit 202 is less than the predetermined time (the first time) (YES in step S702), in step S703, the main control unit (display control unit) 304 allows the LCD display unit 801 of the operation unit 800 to display a screen in FIG. 5B. The screen in FIG. 5B displays that the power supply of the image forming apparatus 1 is turned off after the predetermined time (hereinbelow, referred to as a delay time) elapses. In this case, the screen displayed on the LCD display unit 801 is illustrated in FIG. 5B. According to the present exemplary embodiment, the main control unit 304 starts to execute the power supply off sequence after three minutes after receiving the power supply off request. Thus, the screen in FIG. 5B displays 'The power is off after three minutes'. As a consequence, the user who operates the operation unit 800 is alerted.

Figure 6:
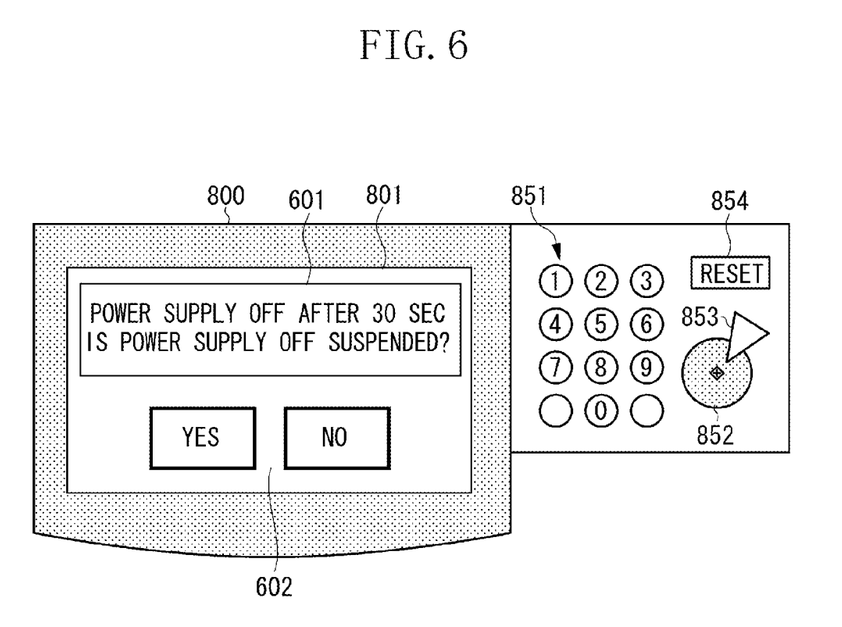
FIG. 6 illustrates a display screen for inquiring of a user about whether an operation according to the present exemplary embodiment continues.

In step S704, the main control unit 304 determines whether the time to the power supply off of the image forming apparatus 1 is less than a predetermined time (e.g., 30 seconds). If the main control unit 304 determines that the time to the power supply off of the image forming apparatus 1 is less than the predetermined time (YES in step S704), in step S705, the main control unit 304 allows the LCD display unit 801 of the operation unit 800 to display a screen in FIG. 6. The screen in FIG. 6 is used for inquiring of the user about whether the operation of the operation unit 800 continues. The screen displayed on the LCD display unit 801 is illustrated in FIG. 6. According to the present exemplary embodiment, the screen in FIG. 6 is displayed before 30 seconds of execution of the power supply off sequence by the main control unit 304. Therefore, the screen in FIG. 6 displays that 'Power supply off after 30 seconds. Is power supply off suspended?'. Thus, the user who operates the operation unit 800 can be alerted.

The screen in FIG. 6 displays an option 602 for allowing the user to select whether the user interrupts or continues the processing for turning off the power supply of the image forming apparatus 1. In step S706, the main control unit 304 determines whether the option 602 is pressed by the user. If the main control unit 304 determines that any button (Yes button or No button) of the option 602 is pressed (YES in step S706), in step S707, the main control unit 304 determines whether the pressed button is the Yes button. If the main control unit 304 determines that the Yes button is pressed (YES in step S707), in step S710, the main control unit 304 interrupts the execution of the power supply off sequence. If the main control unit 304 determines that the No button of the option 602 is pressed (NO in step S707), in step S713, the main control unit 304 executes the power supply off sequence.

If the main control unit 304 determines that any buttons are not pressed after displaying the screen in FIG. 6 (NO in step S706), in step S708, the main control unit 304 determines whether 30 seconds has elapsed. If the main control unit 304 determines that 30 seconds has elapsed (YES in step S708), in step S713, the main control unit 304 executes the power supply off sequence. If the main control unit 304 determines that 30 seconds has not elapsed (NO in step S708), the processing is back to step S706

In step S710, the main control unit 304 interrupts the execution of the power supply off sequence and the user inputs a copy job. In step S711, it is determined whether a setting input by the user or a job has ended. If it is determined that the setting input by the user or the job has ended (YES in step S711), in step S712, it is determined whether a predetermined time (e.g., 30 seconds) has elapsed. If it is determined that the predetermined time (e.g., 30 seconds) has elapsed (YES in step S712), in step S713, the main control unit 304 executes the power supply off sequence. Although the power supply off sequence is executed after the predetermined time (e.g., 30 seconds) has elapsed, the main control unit 304 may execute the power supply off sequence immediately after the end of the job. If the continuous time without operations counted by the counter unit 202 is equal to or more than 30 seconds (YES in step S711 and YES in step S712), in step S713, the main control unit 304 executes the power supply off sequence.

With the image forming apparatus 1 according to the present exemplary embodiment, the continuous time without operations counted by the counter unit 202 is less than the first time, the power state of the image forming apparatus 1 does not change until the delay time elapses (the state does not become the power supply off state). Thus, it is possible to prevent the image forming apparatus 1 from becoming the power supply off state while the user operates the operation unit 800. Even if the power supply off request is received from the external computer 453, the user can continuously perform the setting with the operation unit 800. Therefore, it is possible to prevent erasing the currently set contents due to the image forming apparatus 1 becoming the power supply off state. As a consequence, the convenience of the user is improved because the user does not need to input the set contents again.

A second exemplary embodiment of the present invention will be described. According to the first exemplary embodiment, if the power supply off request is sent to the image forming apparatus 1 from the external computer 453, when the operation unit 800 is operated within a predetermined time before receiving the power supply off request, the screen in FIG. 5B is displayed on the LCD display unit 801. On the other hand, with an image forming apparatus 1 according to the second exemplary embodiment, if the operation unit 800 is operated within a predetermined time before receiving the power supply off request, the screen in FIG. 6 is displayed without displaying the screen in FIG. 5B. The screen in FIG. 6 is used for inquiring of the user about whether the setting continues with the operation unit 800 on the LCD display unit 801.

Figure 8:
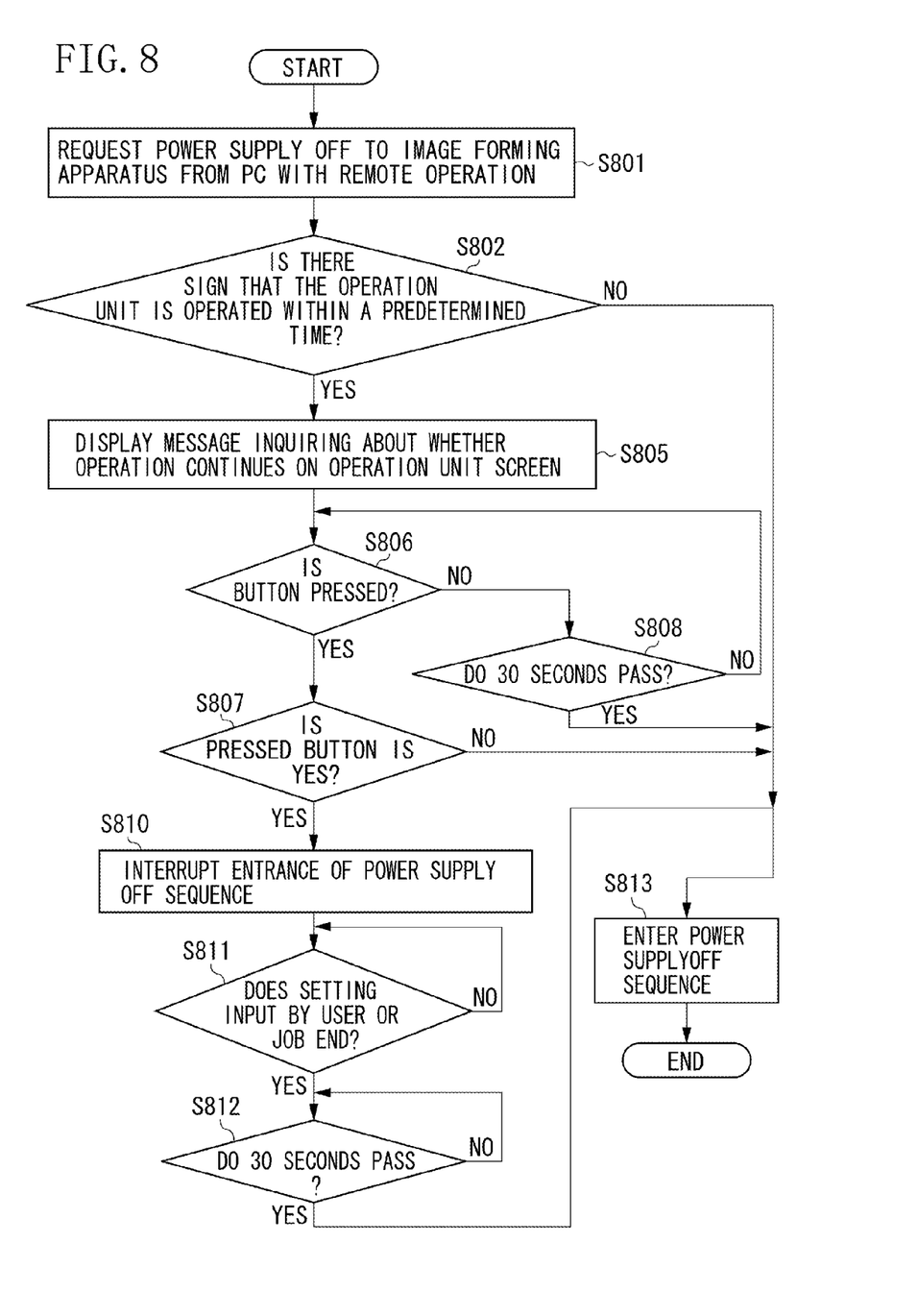
FIG. 8 illustrates a flowchart of an operation when an image forming apparatus according to a second exemplary embodiment of the present invention receives a power supply off request from an external device.

A description is given of a flow to turn off the power supply of the image forming apparatus 1 with the remote operation according to the second exemplary embodiment with reference to FIG. 8.

In step S801, the power supply off request is issued to the image forming apparatus 1 from the external computer 453 via the network. In step S802, the main control unit 304 determines whether the operation unit 800 is operated within a predetermined time before receiving the power supply off request. A specific determination method of the main control unit 304 is similar to that according to the first exemplary embodiment, and a description thereof is thus omitted. If the main control unit 304 determines that the time obtained from the counter unit 202 is equal to or more than a predetermined time (NO in step S802), in step S813, the main control unit 304 executes the power supply off sequence for shutting down the image forming apparatus 1.

If the main control unit 304 determines that the continuous time without operations obtained by the counter unit 202 is less than the predetermined time (YES in step S802), the main control unit 304 allows the LCD display unit 801 of the operation unit 800 to display the screen in FIG. 6.

Steps S806, S807, S808, S810, S811, and S812 executed by the image forming apparatus 1 according to the second exemplary embodiment are similar to steps S706, S707, S708, S710, S711, and S712 executed by the image forming apparatus 1 according to the first exemplary embodiment. A description thereof is thus omitted.

With the image forming apparatus 1 according to the second exemplary embodiment, if the operation unit 800 is not operated within a predetermined time before the power supply off request is received, a screen inquiring of the user about whether the operation continues is displayed on the LCD display unit 801 of the operation unit 800. Thus, if the setting operation ends with the operation unit 800, the user presses the Yes button of the option 602 and the power supply of the image forming apparatus 1 can be immediately turned off.

A third exemplary embodiment of the present invention will be described. According to the first exemplary embodiment, when the power supply off request sent from the external computer 453 with the remote operation is received, and the operation unit 800 of the image forming apparatus 1 is then operated within a predetermined time before receiving the power supply off request, the screen in FIG. 5B is displayed on the LCD display unit 801. The screen in FIG. 5B displays that the power supply of the image forming apparatus 1 is turned off after the delay time elapses. On the other hand, with the image forming apparatus 1 according to the third exemplary embodiment, the user may be alerted by using sound or light and the power supply off sequence may be executed after the delay time elapses.

The image forming apparatus 1 according to the present exemplary embodiment includes a buzzer for outputting sound or a light emitting diode (LED) that outputs light in addition to the configuration of the image forming apparatus 1 according to the first exemplary embodiment.

Figure 9:
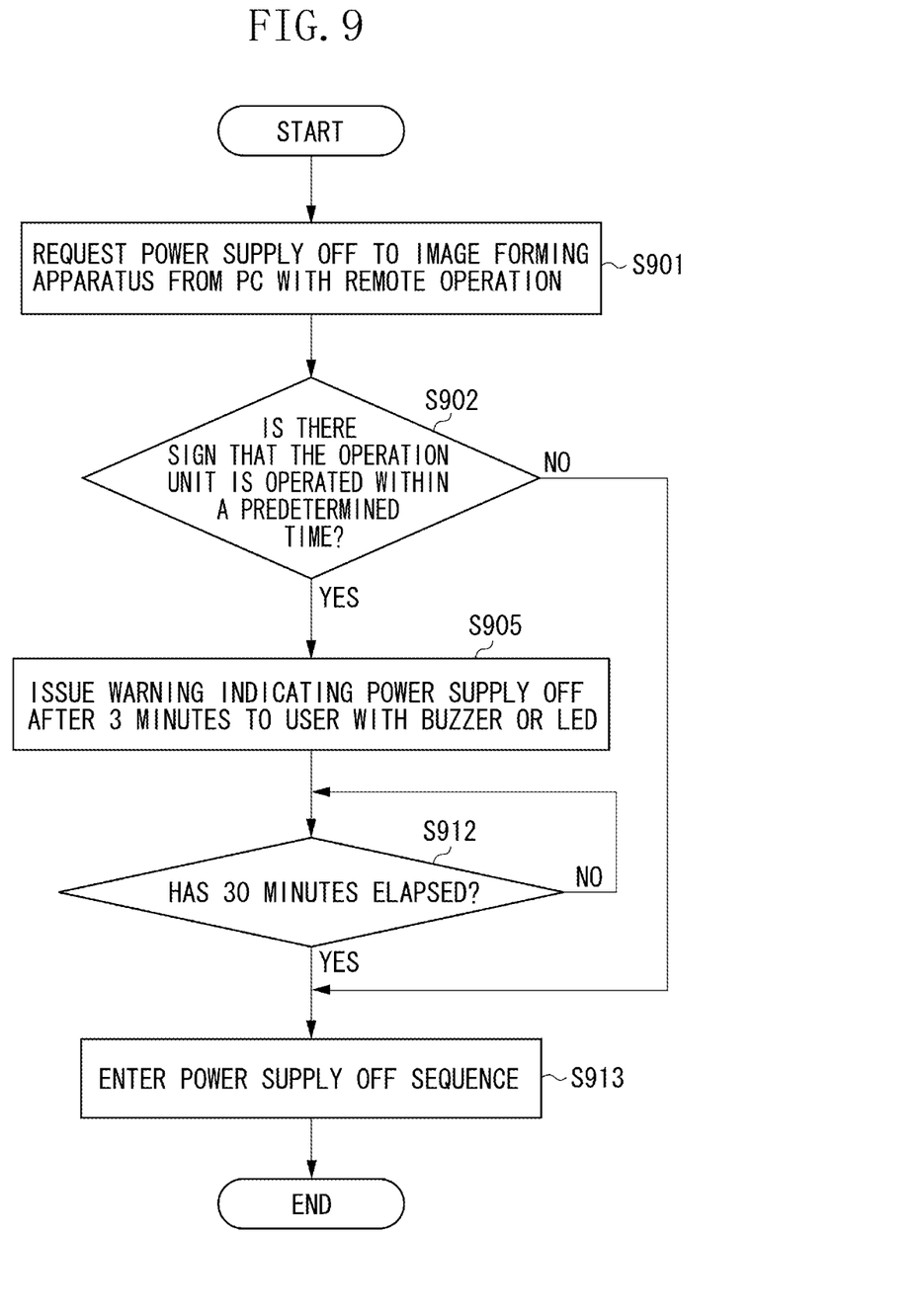
FIG. 9 illustrates a flowchart of an operation when an image forming apparatus according to a third exemplary embodiment of the present invention receives a power supply off request from an external device.

A description is given of a flow to turn off the power supply of the image forming apparatus 1 with the remote operation according to the third exemplary embodiment with reference to FIG. 9.

In step S901, the power supply off request is issued to the image forming apparatus 1 from the external computer 453 via the network. In step S902, the main control unit 304 determines whether the operation unit 800 is operated within a predetermined time before receiving the power supply off request. A specific determination method using the main control unit 304 is similar to that according to the first exemplary embodiment and a description thereof is omitted. If the main control unit 304 determines that the continuous time without operations obtained from the counter unit 202 is equal to or more than a predetermined time (NO in step S902), in step S913, the main control unit 304 executes the power supply off sequence for shutting down the image forming apparatus 1.

If the main control unit 304 determines that the continuous time without operations obtained from the counter unit 202 is less than the predetermined time (YES in step S902), the main control unit 304 controls the buzzer or the LED to output sound or light. As a consequence, the user who operates the operation unit 800 is alerted.

If the delay time (three minutes according to the present exemplary embodiment) elapses after the main control unit 304 receives the power supply off request (YES in step S912), in step S913, the power supply off sequence is executed.

According to the third exemplary embodiment, even if the LCD display unit 801 is not provided or the display capacity of the LCD display unit 801 is low, it is possible to notify, with the buzzer or LED, the user who operates the operation unit 800 of information indicating that the power supply of the image forming apparatus 1 is turned off.

Figure 10:
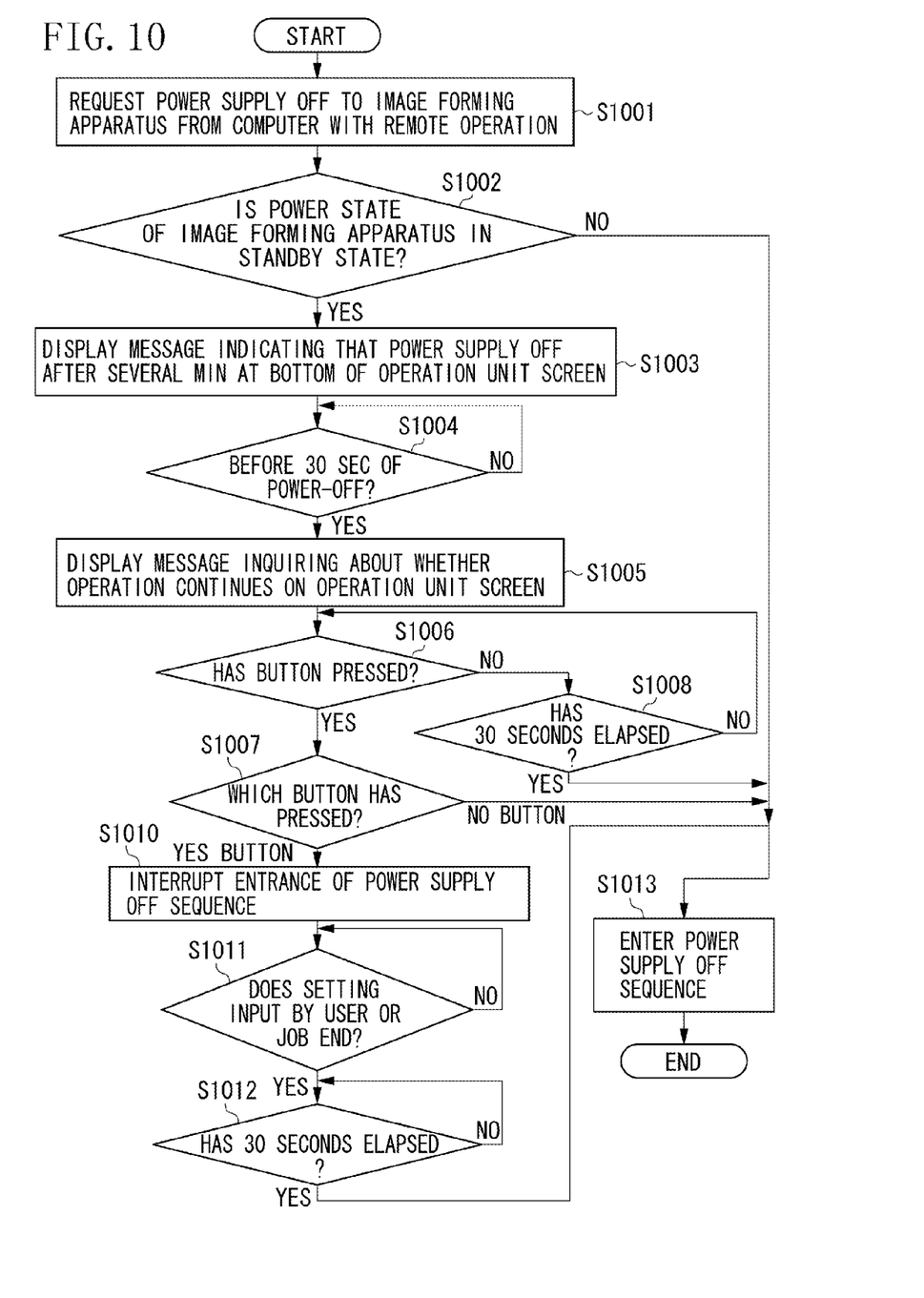
FIG. 10 illustrates a flowchart of an operation when an image forming apparatus according to a fourth exemplary embodiment of the present invention receives a power supply off request from an external device.

A fourth exemplary embodiment of the present invention will be described. According to the first exemplary embodiment, if the operation unit 800 of the image forming apparatus 1 is operated within a predetermined time before receiving the power supply off request when receiving the power supply off request sent from the external computer 453 with the remote operation, the execution of the power supply off sequence is delayed. On the other hand, with an image forming apparatus according to the fourth exemplary embodiment, when the power supply off request is sent to the image forming apparatus 1 from the external computer 453 with the remote operation, the power of the image forming apparatus 1 is controlled depending on the power state of the image forming apparatus 1. Specifically, if the power state of the image forming apparatus 1 is in a first power state (e.g., standby state), the power supply off sequence is executed after the delay time elapses. If the power state of the image forming apparatus 1 is in a second power state (e.g., sleep state), the power supply off sequence is executed without waiting for the delay time.

The image forming apparatus 1 according to the forth exemplary embodiment enters any of the following power modes. In a standby state, the power is supplied to the units in the image forming apparatus 1. In the image forming apparatus 1 in the standby state, the power is supplied to the units including the printer unit 300, the image reader 200, the controller control unit 400, and the external I/F 451. In a sleep state, the power is less consumed as compared with that in the standby state. The image forming apparatus 1 shifts to the sleep state when a sleep shift condition is satisfied. Example of the sleep shift condition is that the operation unit 800 is not operated for a predetermined time. In the image forming apparatus 1 in the sleep state, the power is not supplied to the printer unit 300 and the image reader 200. The power is supplied to the controller control unit 400 and the external I/F 451. In a power supply off state, the power is not supplied to the units in the image forming apparatus 1. The image forming apparatus 1 shifts to the power supply off state in response to the power supply off request after executing the power supply off sequence. If the power switch of the image forming apparatus 1 is turned off, the image forming apparatus 1 shifts to the power supply off state. In the image forming apparatus 1 in the power supply off state, the power supply is shut down to the units including the printer unit 300, the image reader 200, the controller control unit 400, and the external I/F 451.

In the image forming apparatus 1 according to the forth exemplary embodiment, when receiving the power supply off request, it is controlled whether the power supply of the image forming apparatus 1 is immediately turned off depending on the power state of the image forming apparatus 1, or the power supply of the image forming apparatus 1 is turned off after the delay time elapses. In the image forming apparatus 1, when receiving the power supply off request, if the power state of the image forming apparatus 1 is in the standby state, the power state of the image forming apparatus 1 shifts to the power supply off state after the delay time elapses. Further, when receiving the power supply off request, if the power state of the image forming apparatus 1 is in the sleep state, the power state of the image forming apparatus 1 immediately enters the power supply off state.

A description is given of a flow to turn off the power supply of the image forming apparatus 1 with the remote operation according to the forth exemplary embodiment with reference to FIG. 10. The image forming apparatus 1 according to the present exemplary embodiment includes a power state storage unit 430 (refer to FIG. 2) that stores information indicating that the power state of the image forming apparatus 1 is in the standby state or information indicating the sleep state.

In step S1001, the power supply off request is issued to the image forming apparatus 1 from the external computer 453 via the network. In step S1002, the main control unit 304 checks the power state of the image forming apparatus 1 by referring to the power state storage unit 430. If the main control unit 304 determines that the power state of the image forming apparatus 1 is in the sleep state (NO in step S1002), the main control unit 304 sets the power state of the image forming apparatus 1 to the power supply off state. Specifically, in step S1013, the main control unit 304 executes the power supply off sequence for shutting down the image forming apparatus 1.

If the main control unit 304 determines that the power state of the image forming apparatus 1 is in the standby state (YES in step S1002), in step S1003, the main control unit 304 allows the LCD display unit 801 to display the screen indicating that the power state of the image forming apparatus 1 is turned off after the delay time elapses. Processing on and after step S1004 is similar to that on and after step S704 according to the first exemplary embodiment. A description thereof is omitted.

In the image forming apparatus 1 according to the forth exemplary embodiment, if the power state of the image forming apparatus 1 is in the standby state, the power state of the image forming apparatus 1 does not immediately enter the power supply off state even after receiving the power supply off request, but enters the power supply off state after the elapse of the delay time after receiving the power supply off request. In other words, if the image forming apparatus 1 according to the forth exemplary embodiment is in the standby state, the power state of the image forming apparatus 1 is not turned off before the elapse of the delay time even if the power supply off request is received. Namely, in the standby state for using the image forming apparatus 1, the power state of the image forming apparatus 1 is not immediately turned off after receiving the power supply off request. Therefore, it is suppressed that contents set with the operation unit 800 by the user are invalid due to the image forming apparatus 1 becoming the power supply off. Thus, the user does not need to set the contents again and the convenience of the user is improved.

The exemplary embodiments are to be construed in all respects as illustrative and not restrictive. A range of the present invention is not indicated based on the above description of the exemplary embodiments but based on the scope of claims, and all changes which come within the meaning and range of equivalency of the scope of claims are intended to be embraced in the present invention.

Figure 11A:
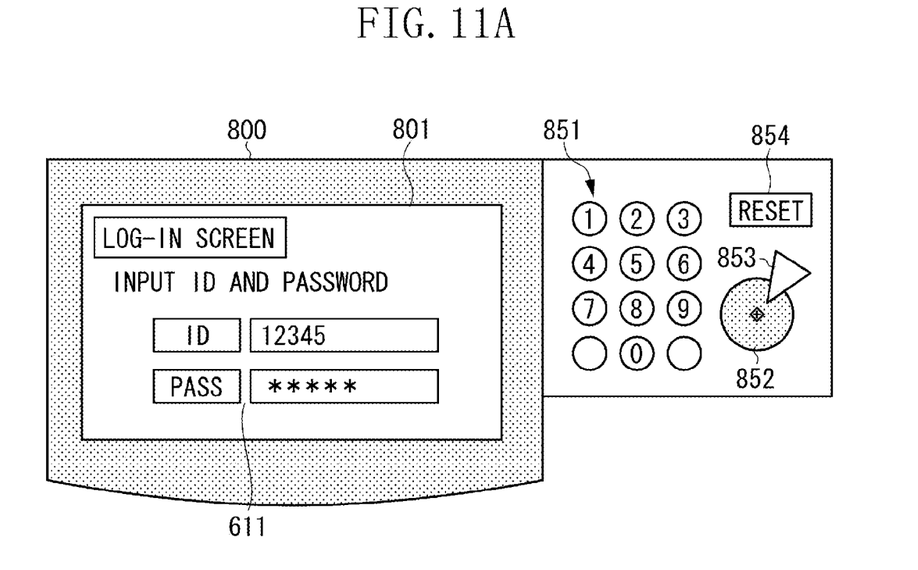
FIGS. 11A and 11B illustrate a state for displaying a user authentication screen on a liquid crystal display (LCD) display unit of an operation unit.
Figure 11B:
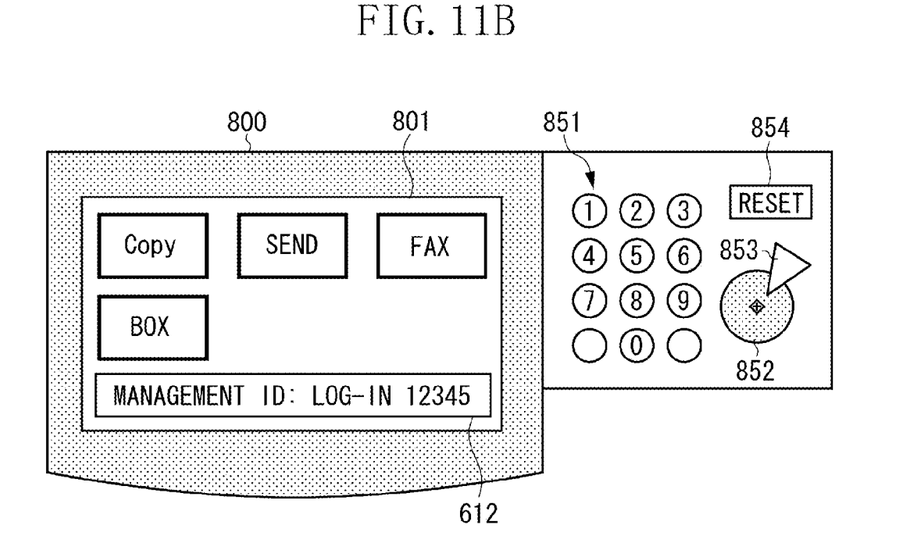

A modification will be described. According to the first to third exemplary embodiments, if the user does not operate the operation unit 800 within a predetermined time before receiving the power supply off request, the power state of the image forming apparatus 1 is immediately turned off. However, the present invention is not limited to this. Specifically, when the user inputs an identification (ID) and a password on a user authentication screen in FIG. 11A to log in the image forming apparatus 1, the power supply off of the image forming apparatus 1 is delayed. A screen in FIG. 11B is in a state in which the user logs in the image forming apparatus 1 on the user authentication screen in FIG. 11A. If the user does not login the image forming apparatus 1, the power of the image forming apparatus 1 is immediately turned off.

Figure 12:
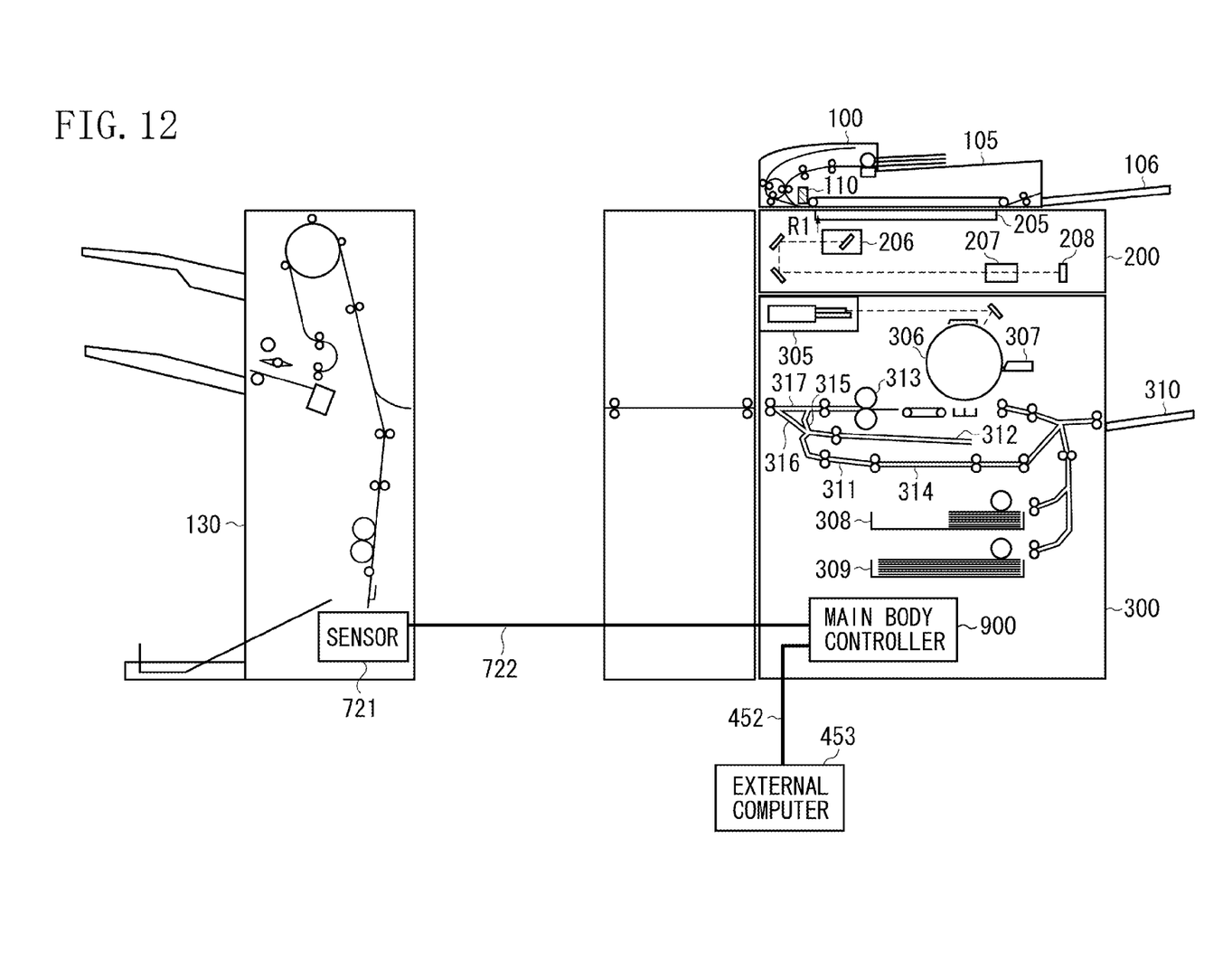
FIG. 12 illustrates an image forming apparatus when a finisher is deviated.

Referring to FIG. 12, in the image forming apparatus 1 according to the modification, a finisher 130 is displaced for maintenance when sheet jam occurs. The image forming apparatus 1 in FIG. 12 according to the modification includes a sensor 721 that detects the displacement of the finisher 130. Information detected by the sensor 721 is sent to the main control unit 304 via a cable 722. The main control unit 304 thus determines the displacement of the finisher 130. In the image forming apparatus 1 according to the modification, when receiving the power supply off request, it is controlled whether the power state of the image forming apparatus 1 is turned off depending on whether maintenance is performed. Specifically, if the image forming apparatus 1 according to the modification receives the power supply off request, during the maintenance, the power supply of the image forming apparatus 1 is turned off after the elapse of the delay time. In the case where the maintenance is not performed, the power supply of the image forming apparatus 1 is turned off.

According to the first to third exemplary embodiments, the user does not operate the operation unit 800 in the image forming apparatus 1 within a predetermined time before receiving the power supply off request, the power of the image forming apparatus 1 is immediately turned off. The predetermined time may be a value changeable by a setting of the user.

If the user does not operate the operation unit 800 for a predetermined time (hereinafter, referred to as an auto-clear time), the image forming apparatus 1 includes an auto-clear function for returning the display screen of the operation unit 800 to an initial screen. In the image forming apparatus 1 according to the first to fourth exemplary embodiments, if the user does not operate the operation unit 800 within a predetermined time before receiving the power supply off request, it is controlled in response to the power supply off request that the power supply of the image forming apparatus 1 is turned off. In place of the predetermined time, the auto-clear time may be used.

Specifically, the image forming apparatus according to the modification is in any of the first power state and the second power state for saving the power more than that in the first power state. The image forming apparatus includes a reception unit configured to receive data sent from an external device, a counting unit configured to count a time without operations of an operation unit by a user, and a shift unit configured, if the data received by the reception unit shifts the power state of the image forming apparatus from the first power state to the second power state, in a case where the time without operations is equal to or more than an auto-clear time, to execute shift processing for shifting the power state of the image forming apparatus from the first power state to the second power state, and in a case where the time without operations is less than the auto-clear time, to execute the shift processing after a predetermined time.

According to the fourth exemplary embodiment, when receiving the power supply off request, a timing for changing the power state of the image forming apparatus is changed depending on the power state of the image forming apparatus. However, the present invention is not limited to this. When receiving the power supply off request, the timing for changing the power state of the image forming apparatus may be changed depending on as to whether the display unit in the operation unit of the image forming apparatus is lit.

Specifically, the image forming apparatus according to the modification is in any of a first power state and a second power state different from the first power state. The image forming apparatus includes a reception unit configured to receive data sent from an external device, and a shift unit configured, if the data received by the reception unit shifts the power state of the image forming apparatus from the first power state to the second power state and then, in a case where a display unit of the image forming apparatus is not lit, to execute shift processing for shifting the power state of the image forming apparatus from the first power state to the second power state, and in a case where the display unit of the image forming apparatus is lit, to execute the shift processing after elapse of a predetermined time.

According to the exemplary embodiments and modification, the power state of the image forming apparatus is set to the power supply off state. However, the present invention is not limited to this. When receiving the data for shifting the power state of the image forming apparatus to the sleep state from the external device, it may be controlled to change the power state of the image forming apparatus based on as to whether the operation unit in the image forming apparatus is operated within a predetermined time before receiving the data.

According to the present invention, a program (an exemplary embodiment corresponds to the flowcharts illustrated in the drawings) of software for realizing functions of the exemplary embodiments is supplied directly or from a remote external device to a system or a device. A computer of the system or the device may read and execute the supplied program code.

OTHER EMBODIMENTS

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-025333 filed Feb. 8, 2012, which is hereby incorporated by reference herein in its entirety.

What is claimed is:

1. An image forming apparatus configured to enter in a first power state in which electric power is not supplied to a part of the image forming apparatus and in a second power state in which electric power is supplied to the part of the image processing apparatus, the image forming apparatus comprising:
   a reception unit configured to receive a power down command sent from an external device, which causes the image forming apparatus to enter in the first power state from the second power state;
   an operation unit configured to receive an operation of a user; and
   a control unit (1) configured, if the reception unit receives the power down command in a case where an elapse time without operating the operation unit is less than a preset time, to execute shift processing for shifting the power state of the image forming apparatus from the second power state to the first power state when a predetermined time has elapsed after receiving the power down command, and (2) configured, if the reception unit receives the power down command in a case where the elapse time without operating the operation unit is equal to or more than the preset time, to execute the shift processing for shifting the power state of the image forming apparatus from the second power state to the first power state before the predetermined time has elapsed after receiving the power down command.

2. The image forming apparatus according to claim 1, further comprising a display control unit configured, if the reception unit receives the power down command, in a case where the elapse time without operating the operation unit is less than the preset time, to display a screen for displaying change of the power state of the image forming apparatus on a display unit of the image forming apparatus.

3. The image forming apparatus according to claim 2, wherein the display control unit displays a remaining time before changing the power state of the image forming apparatus on the screen.

4. The image forming apparatus according to claim 1, further comprising an instruction unit configured to instruct an interruption of the execution of the shift processing,
wherein the control unit interrupts the execution of the shift processing if the instruction unit instructs the instruction for interrupting the execution of the shift processing.

5. The image forming apparatus according to claim 1, wherein the first power state is a state where the power supply of the image forming apparatus is in an off state.

6. The image forming apparatus according to claim 1, wherein the preset time is predetermined by the user.

7. The image forming apparatus according to claim 1, wherein the preset time is an auto-clear time for the screen displayed on the display unit of the image forming apparatus to return to an initial screen.

8. A control method of an image forming apparatus configured to enter in a first power state in which electric power is not supplied to a part of the image forming apparatus and in a second power state in which electric power is supplied to the part of the image processing apparatus, the control method comprising:
receiving a power down command sent from an external device, which causes the image forming apparatus to enter in the first power state from the second power state; and
executing, (1) if the power down command is received, in a case where an elapse time without operating an operation unit is less than a preset time, shift processing for shifting the power state of the image forming apparatus from the second power state to the first power state when a predetermined time has elapsed after receiving the power down command, and (2) configured, if the reception unit receives the power down command in a case where the elapse time without operating the operation unit is equal to or more than the preset time, the shift processing for shifting the power state of the image forming apparatus from the second power state to the first power state before the predetermined time has elapsed after receiving the power down command.

9. A non-transitory computer-readable storage medium storing a program for causing a computer to execute the control method of the image forming apparatus according to claim 8.

* * * * *